(12) United States Patent
Yachida et al.

(10) Patent No.: US 12,360,054 B2
(45) Date of Patent: Jul. 15, 2025

(54) INSPECTION SYSTEM

(71) Applicant: NEC Corporation, Tokyo (JP)

(72) Inventors: Shoji Yachida, Tokyo (JP); Keiko Inoue, Tokyo (JP); Azusa Sawada, Tokyo (JP); Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 469 days.

(21) Appl. No.: 17/919,778

(22) PCT Filed: Apr. 24, 2020

(86) PCT No.: PCT/JP2020/017749
§ 371 (c)(1),
(2) Date: Oct. 19, 2022

(87) PCT Pub. No.: WO2021/214994
PCT Pub. Date: Oct. 28, 2021

(65) Prior Publication Data
US 2023/0175975 A1    Jun. 8, 2023

(51) Int. Cl.
*G01N 21/90* (2006.01)
*G06T 7/20* (2017.01)
(52) U.S. Cl.
CPC ............. *G01N 21/90* (2013.01); *G06T 7/20* (2013.01)
(58) Field of Classification Search
CPC ............. G01N 21/90; G01N 21/9027; G01N 21/8851; G06T 7/20; G06T 2207/20081;
(Continued)

(56) References Cited

U.S. PATENT DOCUMENTS 7,982,868 B2 * 7/2011 Akkerman ......... G01N 21/9036
356/240.1
11,313,808 B2 * 4/2022 Werk ................. G01N 21/9027

FOREIGN PATENT DOCUMENTS

CN    108414534 A    8/2018
JP    H9-054047 A    2/1997
(Continued)

OTHER PUBLICATIONS

JP Office Action for JP Application No. 2022-516807, mailed on Jul. 18, 2023 with English Translation.
(Continued)

*Primary Examiner* — Neil R McLean
(74) *Attorney, Agent, or Firm* — Sughrue Mion, PLLC

(57) ABSTRACT

An inspection system includes: a suspended matter detecting and tracking means that detects and tracks suspended matter present in the liquid in the container in chronological images obtained by consecutively imaging the liquid with a camera; a determining and storage controlling means that determines, based on a movement locus of the tracked suspended matter, whether the suspended matter is foreign matter or an air bubble, and stores inspection result information including a result of the determination and information of the movement locus of the suspended matter used as a basis for the determination into a storing means in association with identification information of the container; and a display controlling means that causes a displaying means to display the result of the determination and the information of the movement locus of the suspended matter used as the basis for the determination included by the inspection result information.

13 Claims, 12 Drawing Sheets

(58) Field of Classification Search
CPC ......... G06T 2207/20084; G06T 7/0002; G06T 7/215; G06T 7/254; G06T 2207/10016
USPC ........................................................ 382/103
See application file for complete search history.

(56) References Cited

FOREIGN PATENT DOCUMENTS

| JP | 2004-354100 A | 12/2004 |
|---|---|---|
| JP | 2013-044688 A | 3/2013 |
| JP | 2014-109526 A | 6/2014 |
| JP | 2019-174346 A | 10/2019 |

OTHER PUBLICATIONS

International Search Report for PCT Application No. PCT/JP2020/017749, mailed on Jul. 21, 2020.
Ji Ge et al., "A System for Automated Detection of Ampoule Injection Impurities", IEEE Transactions on Automation Science and Engineering, Apr. 2017, vol. 14, No. 2, pp. 1119-1128, Print ISSN:1545-5955, Item "III. Particle Recognition".

\* cited by examiner

FIG. 3

232 IMAGE INFORMATION

| CONTAINER ID (2321) | IMAGING TIME (2322) | FRAME IMAGE (2323) |
|---|---|---|
| ⋮ | ⋮ | ⋮ | ially encapsulated in a container; and a display controlling means configured to cause a displaying means to display the result of the determination and the information of the movement locus of the suspended matter used as the basis for the determination included by the inspection result information.

INSPECTION SYSTEM

This application is a National Stage Entry of PCT/JP2020/017749 filed on Apr. 24, 2020, the contents of all of which are incorporated herein by reference, in their entirety.

TECHNICAL FIELD

The present invention relates to an inspection system that inspects whether foreign matter is present in a liquid encapsulated in a container, an inspection method, and a recording medium.

BACKGROUND ART

An inspection system that inspects whether foreign matter is present in a liquid encapsulated in a transparent or translucent container has been proposed.

For example, in Patent Document 1, the shadow of an air bubble is removed by image processing from the shadows of suspended matters recorded in an image obtained by imaging a liquid encapsulated in a transparent container, and the shadow of suspended matter still present in the image is detected as foreign matter. In the above image processing, first, a set A of individual suspended matter differential images that are differential images of images (shadows) corresponding to individual suspended matters is extracted. Next, a set B of air bubble candidates is selected using the static property of air bubble (feature value of image). Next, a set C of original air bubbles is determined from the set B of air bubble candidates using the dynamic property of air bubble (movement due to buoyancy, and the like). Finally, foreign matter is detected as a residue left after subtracting the set C of original air bubbles from the set A of individual suspended matter differential images.

Patent Document 1: Japanese Unexamined Patent Application Publication JP-A 2004-354100

As described above, an inspection system that inspects whether foreign matter is present in a liquid encapsulated in a transparent container performs determination by distinguishing an air bubble from foreign matter using the dynamic property of air bubble. The inspection system is not configured to store the grounds for determination together with the result of determination. Therefore, it is difficult to confirm the grounds for determination together with the result of determination at any point of time after inspection for each inspected container.

SUMMARY

An object of the present invention is to provide an inspection system that solves the abovementioned problem.

An inspection system as an aspect of the present invention is an inspection system inspecting whether foreign matter is present or absent in a liquid encapsulated in a container. The inspection system includes: a suspended matter detecting and tracking means configured to detect and track suspended matter present in the liquid encapsulated in the container in chronological images obtained by consecutively imaging the liquid with a camera; a determining and storage controlling means configured to determine, based on a movement locus of the tracked suspended matter, whether the suspended matter is foreign matter or an air bubble, and store inspection result information including a result of the determination and information of the movement locus of the suspended matter used as a basis for the determination into a storing means in association with identification information of the container; and a display controlling means configured to cause a displaying means to display the result of the determination and the information of the movement locus of the suspended matter used as the basis for the determination included by the inspection result information.

Further, an inspection method as another aspect of the present invention is an inspection method for inspecting whether foreign matter is present or absent in a liquid encapsulated in a container. The inspection method includes: detecting and tracking suspended matter present in the liquid encapsulated in the container in chronological images obtained by consecutively imaging the liquid with a camera; determining, based on a movement locus of the tracked suspended matter, whether the suspended matter is foreign matter or an air bubble; storing inspection result information including a result of the determination and information of the movement locus of the suspended matter used as a basis for the determination into a storing means in association with identification information of the container; and causing a displaying means to display the result of the determination and the information of the movement locus of the suspended matter used as the basis for the determination included by the inspection result information.

Further, a computer-readable recording medium as another aspect of the present invention is a non-transitory computer-readable recording medium on which a program is recorded. The program includes instructions for causing a computer inspecting whether foreign matter is present or absent in a liquid encapsulated in a container to perform processes to: detect and track suspended matter present in the liquid encapsulated in the container in chronological images obtained by consecutively imaging the liquid with a camera; determine, based on a movement locus of the tracked suspended matter, whether the suspended matter is foreign matter or an air bubble; store inspection result information including a result of the determination and information of the movement locus of the suspended matter used as a basis for the determination into a storing means in association with identification information of the container; and cause a displaying means to display the result of the determination and the information of the movement locus of the suspended matter used as the basis for the determination included by the inspection result information.

With the configurations as described above, the present invention makes it possible to easily confirm the grounds for determination together with the result of determination at any point of time after inspection for each inspected container.

BRIEF DESCRIPTION OF DRAWINGS

FIG. 3 is a view showing an example of a configuration of image information in the first example embodiment of the present invention;

EXAMPLE EMBODIMENTS

Next, a first example embodiment of the present invention will be described in detail with reference to the drawings.

Figure 1:
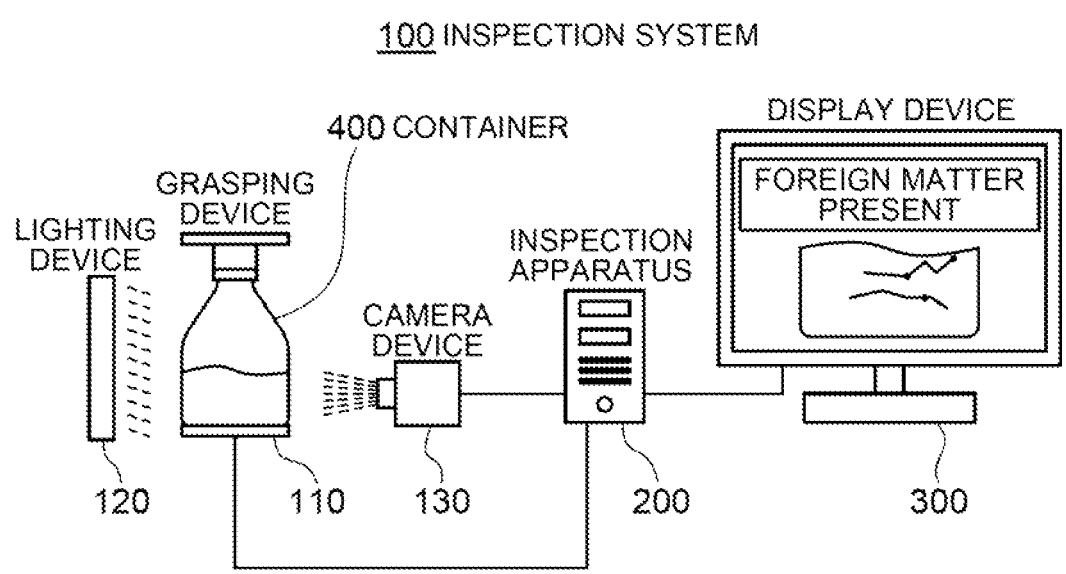
FIG. 1 is a block diagram of an inspection system according to a first example embodiment of the present invention.

FIG. 1 is a block diagram of an inspection system 100 according to the first example embodiment of the present invention. Referring to FIG. 1, the inspection system 100 is a system that inspects whether foreign matter is present in a liquid encapsulated in a container 400. The inspection system 100 includes, as major components, a grasping device 110, a lighting device 120, a camera device 130, an inspection apparatus 200, and a display device 300.

The container 400 is a transparent or translucent container such as a glass bottle or a plastic bottle. A liquid such as medicine or water is encapsulated and filled in the container 400. There is a possibility that the liquid encapsulated in the container 400 contains foreign matter. As the foreign matter, for example, a piece of glass, a piece of plastic, a piece of rubber, hair, a piece of fiber, soot, and the like are conceivable.

The grasping device 110 is configured to grasp the container 400 in a predetermined posture. The predetermined posture may be any posture. For example, the predetermined posture may be a posture when the container 400 is upright. Alternatively, the predetermined posture may be a posture in which the container 400 tilts at a predetermined angle from the upright posture. In the following description, the predetermined posture is assumed to be a posture in which the container 400 is upright. A mechanism for grasping the container 400 in the upright posture may be any mechanism. For example, the grasping mechanism may include a seat on which the container 400 is placed in the upright posture, a member that presses the upper surface of a cap 401 that is the top of the container 400 placed on the seat, and others.

Further, the grasping device 110 is configured to tilt, swing, or rotate the container 400 in a predetermined direction from the upright posture while grasping the container 400. A mechanism for tilting, swinging, or rotating the container 400 may be any mechanism. For example, the mechanism for tilting, swinging, or rotating may include a motor that tilts, swings, or rotates the entire grasping mechanism while grasping the container 400.

Further, the grasping device 110 is connected to the inspection apparatus 200 by wire or wirelessly. When started in response to an instruction from the inspection apparatus 200, the grasping device 110 tilts, swings, or rotates the container 400 in a predetermined direction from the upright posture while grasping the container 400. When stopped in response to an instruction from the inspection apparatus 200, the grasping device 110 stops the operation to tilt, swing, or rotate the container 400, and returns to a state of grasping the container 400 in the upright posture.

When the container 400 is tilted, swung or rotated and then made to keep still as described above, a state in which the liquid is moving in the container 400 keeping still is obtained. When the liquid is moving, a state in which foreign matter contained in the liquid is suspended is obtained. Moreover, when the liquid moves, there is a possibility that an air bubble adhering to the inner wall surface of the container 400 and an air bubble mixed in while the liquid is moving may be suspended in the liquid. Therefore, there is a need to identify whether the suspended matter is foreign matter or an air bubble.

The lighting device 120 is configured to emit illumination light to the liquid encapsulated in the container 400. The lighting device 120 is, for example, an area light source having a size corresponding to the size of the container 400. The lighting device 120 is installed on the opposite side to a side on which the camera device 130 is installed when viewed from the container 400. That is to say, the illumination light emitted by the lighting device 120 is transmissive light.

The camera device 130 is an imaging device that images the liquid in the container 400 consecutively at a predetermined frame rate from a predetermined position on the opposite side to a side on which the lighting device 120 is installed when viewed from the container 400. The camera device 130 may include, for example, a color camera equipped with a CCD (Charge-Coupled Device) image sensor or a CMOS (Complementary MOS) image sensor having a pixel capacity of several million pixels. The camera device 130 is connected to the inspection apparatus 200 by wire or wirelessly. The camera device 130 is configured to transmit chronological images obtained by imaging together with information indicating imaging time to the inspection apparatus 200.

The display device 300 is a display device such as an LCD (Liquid Crystal Display). The display device 300 is connected to the inspection apparatus 200 by wire or wirelessly. The display device 300 is configured to display the result of inspection of the container 400 performed by the inspection apparatus 200, and the like.

The inspection apparatus 200 is an information processing apparatus that performs image processing on the chronological images obtained by imaging by the camera device 130 and inspects whether foreign matter is present in the liquid encapsulated in the container 400. The inspection apparatus 200 is connected to the grasping device 110, the camera device 130 and the display device 300 by wire or wirelessly.

Figure 2:
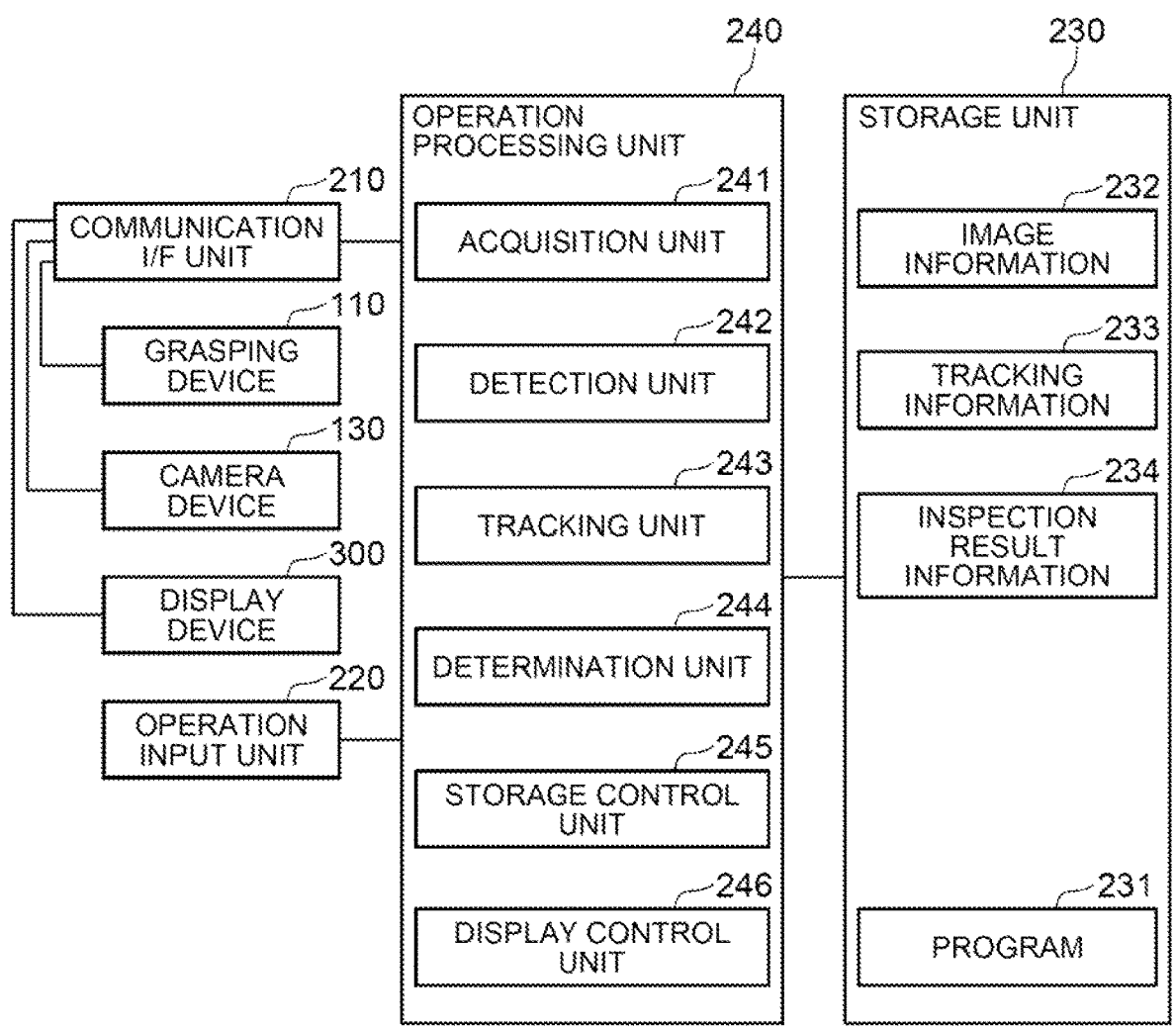
FIG. 2 is a block diagram showing an example of an inspection apparatus in the first example embodiment of the present invention.

FIG. 2 is a block diagram showing an example of the inspection apparatus 200. Referring to FIG. 2, the inspection apparatus 200 includes a communication I/F unit 210, an operation input unit 220, a storage unit 230, and an operation processing unit 240.

The communication I/F unit 210 is formed by a data communication circuit, and is configured to perform data communication by wire or wirelessly with the grasping device 110, the camera device 130, the display device 300, and another external device that is not illustrated. The operation input unit 220 is formed by an operation input device such as a keyboard and a mouse, and is configured to detect an operator's operation and output to the operation processing unit 240.

The storage unit 230 is formed by one or more storage devices of one type or multiple types such as a hard disk and a memory, and is configured to store therein processing information necessary for various processing in the operation processing unit 240 and a program 231. The program 231 is a program loaded to and executed by the operation processing unit 240 to implement various processing units, and is loaded in advance from an external device or a recording medium that is not illustrated via a data input/output function such as the communication I/F unit 210, and stored into the storage unit 230. Major processing information stored in the storage unit 230 includes image information 232, tracking information 233, and inspection result information 234. Of the above information, at least the inspection result information 234 is stored in a storage device that does not lose the stored information even if the information processing apparatus is powered off.

The image information 232 includes chronological images obtained by consecutively imaging the liquid in the container 400 with the camera device 130. FIG. 3 shows an example of a configuration of the image information 232. The image information 232 in this example includes an entry composed of a set of container ID 2321, imaging time 2322, and frame image 2323. An ID for uniquely identifying the inspected container 400 is set in the item of the container ID 2321. As the container ID 2321, a serial number assigned to the container 400, a barcode attached to the container 400, object fingerprint information collected from the cap 401 or the like of the container 400, and the like are conceivable. In the items of the imaging time 2322 and the frame image 2323, imaging time and a frame image are set, respectively. The imaging time 2322 is set to a precision (for example, in units of milliseconds) that makes it possible to identify distinctively from another frame image with the same container ID. Although the container ID 2321 is associated with each frame image 2323 in the example of FIG. 3, the container ID 2321 may be associated with each group including a plurality of frame images 2323.

Figure 4:
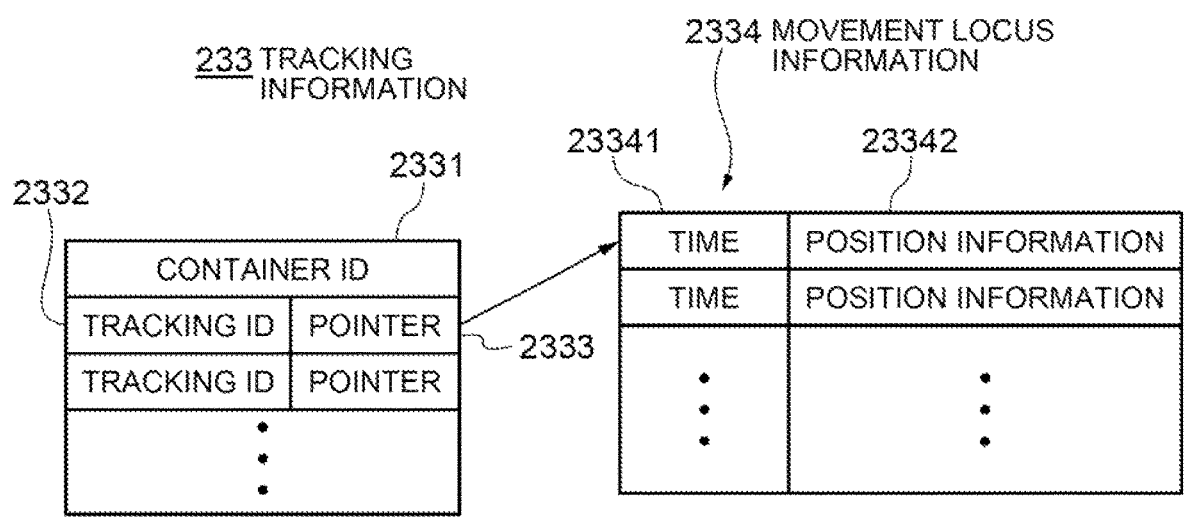
FIG. 4 is a view showing an example of a configuration of tracking information in the first example embodiment of the present invention.

The tracking information 233 includes information corresponding to the result of detecting and tracking suspended matter present in the liquid in container 400. FIG. 4 shows an example of a configuration of the tracking information 233. The tracking information 233 in this example includes an entry of the container ID 2331 and an entry of a set of tracking ID 2332 and pointer 2333. An ID for uniquely identifying the container 400 is set in the entry of the container ID 2331. An entry composed of the set of the tracking ID 2332 and the pointer 2333 is provided for each tracked suspended matter. An ID for distinguishing the tracked suspended matter from other suspended matter in the same container 400 is set in the item of the tracking ID 2332. A pointer to movement locus information 2334 of the tracked suspended matter is set in the item of the pointer 2333.

The movement locus information 2334 includes an entry composed of a set of time 23341 and position information 23342. In the items of the time 23341 and the position information 23342, imaging time and coordinate values indicating the position of the tracked suspended matter at the imaging time are set, respectively. The coordinate values may be, for example, coordinate values in a predetermined coordinate system. The predetermined coordinate system may be a camera coordinate system centered on the camera, or a world coordinate system centered on a certain position in space. The entries in the movement locus information 2334 are arranged in order of the time 23341. The time 23341 of the top entry is tracking start time. The time 23341 of the last entry is tracking end time. The time 23341 of the entry other than the top and last entries is tracking intermediate time.

Figure 5:
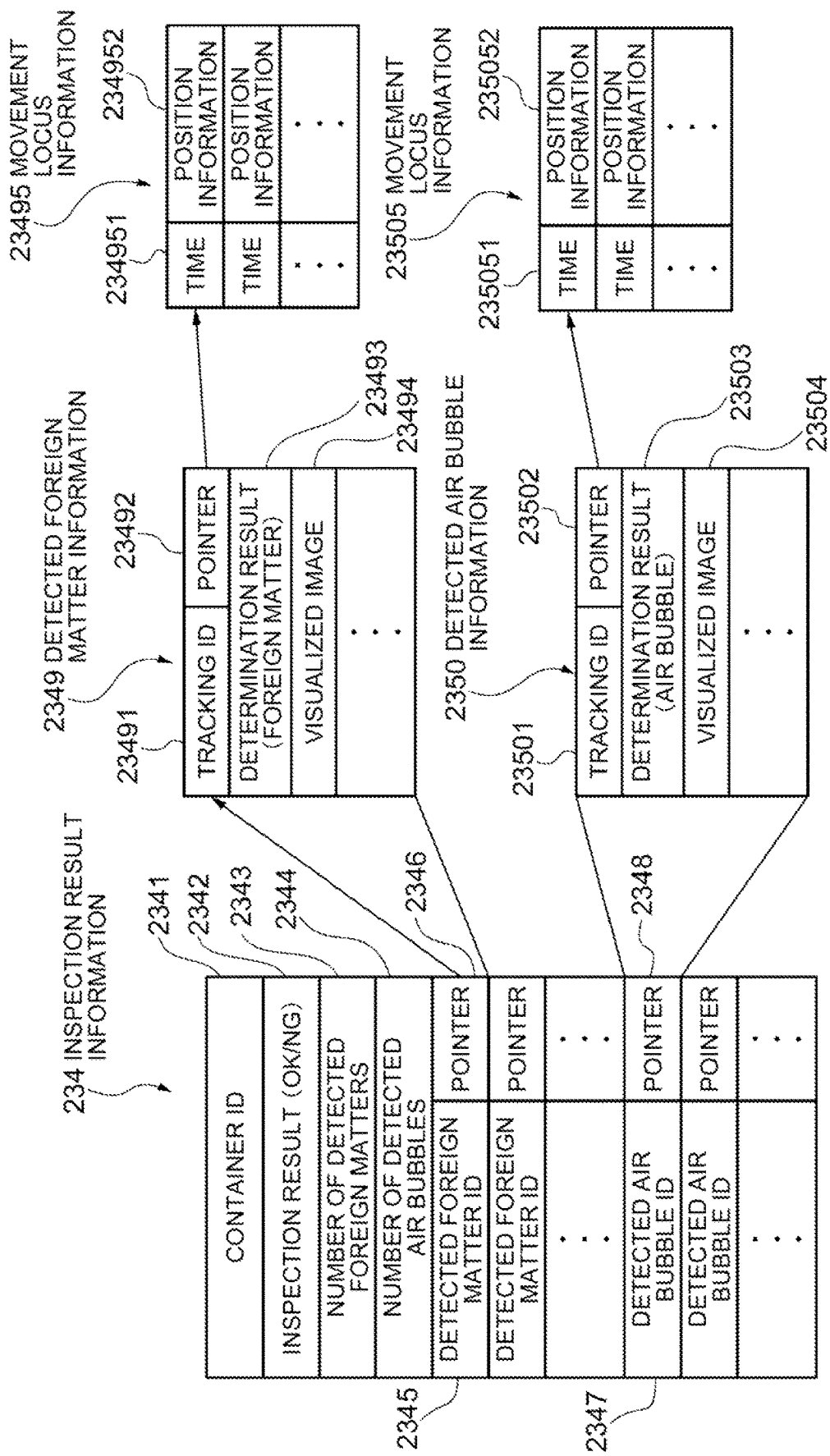
FIG. 5 is a view showing an example of a configuration of inspection result information in the first example embodiment of the present invention.

The inspection result information 234 includes information corresponding to the inspection result of the container 400. FIG. 5 shows an example of a configuration of the inspection result information 234. The inspection result information 234 in this example includes an entry of container ID 2341, an entry of inspection result 2342, an entry of number of detected foreign matters 2343, an entry of number of detected air bubbles 2344, an entry of a set of detected foreign matter ID 2345 and pointer 2346, and an entry of a set of detected air bubble ID 2347 and pointer 2348. In the entry of the container ID 2341, an ID for uniquely identifying the inspection target container 400 is set. In the entry of the inspection result 2342, an inspection result of either OK (passed inspection) or NG (failed inspection) is set. In the entry of the number of detected foreign matters 2343, the total number of detected foreign matters is set. In the entry of the number of detected air bubbles 2344, the total number of detected air bubbles is set.

The entry of the set of the detected foreign matter ID 2345 and the pointer 2346 is provided for each detected foreign matter. In the item of the detected foreign matter ID 2345, an ID for distinguishing the detected foreign matter from another foreign matter in the same container 400 is set. In the item of the pointer 2346, a pointer to detected foreign matter information 2349 of the detected foreign matter is set.

The entry of the set of the detected air bubble ID 2347 and the pointer 2348 is provided for each detected air bubble. In the item of the detected air bubble ID 2347, an ID for distinguishing the detected air bubble from another air bubble in the same container 400 is set. In the item of the pointer 2348, a pointer to detected air bubble information 2350 of the detected air bubble is set.

The detected foreign matter information 2349 includes an of a set of tracking ID 23491 and pointer 23492, an entry of determination result 23493, and an entry of visualized image 23494. In the item of the tracking ID 2332, the tracking ID 2332 of the detected foreign matter is set. In the item of the pointer 23492, a pointer to movement locus information 23495 of the detected foreign matter is set. The movement locus information 23495 is a copy of the movement locus information 2334 at the time of tracking of the detected foreign matter. That is to say, the movement locus information 23495 includes an entry composed of a set of time 234951 and position information 234952 corresponding to the entry composed of the set of the time 23341 and the position information 23342. In the entry of the determination result 23493, a text representing that the determination result is "foreign matter" is set. In the entry of the determination result 23493, a probability of the determination result may further be set. The probability of the determination result is an index representing the likelihood of the determination result.

Figure 6:
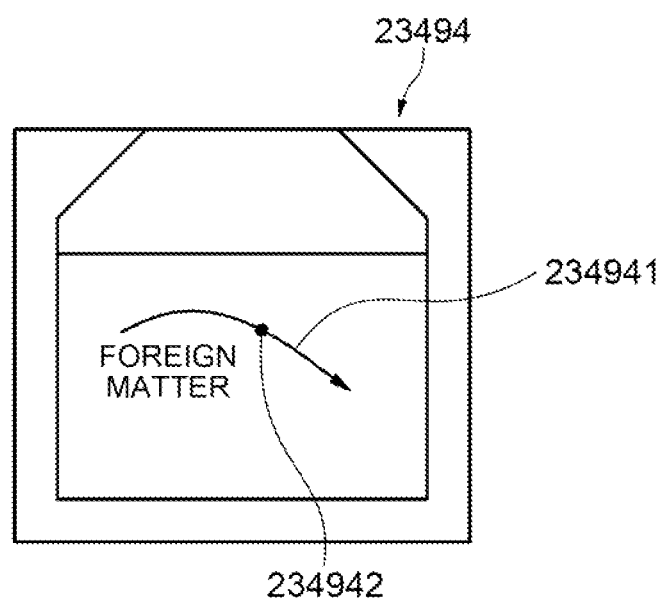
FIG. 6 is a schematic diagram showing an example of an image that visualizes movement locus information of foreign matter in the first example embodiment of the present invention.

In the entry of the visualized image 23494, at least one image that visualizes the movement locus information 23495 of the detected foreign matter is set. That is to say, the number of the visualized images 23494 may be any number as long as it is one or more. FIG. 6 is a schematic diagram showing an example of the image that visualizes the movement locus information 23495 of the detected foreign matter. The visualized image 23494 in this example is obtained by superimposing a camera image used as a background image and a line image 234941 representing the movement locus of foreign matter. In FIG. 6, an image portion other than the line image 234941 corresponds to the camera image used as the background. As the camera image used as the background, for example, a specific frame image in which detected foreign matter is shown may be used. As the specific frame image, a frame image at any point of time during a period of tracking the detected foreign matter, for example, a frame image at the tracking start time, the tracking intermediate time, or the tracking end time may be used. Moreover, a position 234942 of the foreign matter shown in the camera image may be highlighted so as to be easy to notice. Possible methods of highlighting are edge enhancement, coloring, rectangle display, and the like. Moreover, in FIG. 6, it is drawn with characters whether the visualized image belongs to a class of foreign matter or a class of air bubble. However, the class information may be drawn by changing the color of a rectangle to be highlighted in accordance with the class, instead of drawing with characters. Moreover, an arrow indicating the moving direction of the foreign matter is added to the line image 234941 representing the movement locus of the foreign matter. However, an aspect representing the moving direction of the foreign matter is not limited to the arrow. For example, the line type, width and the like of the line representing the movement locus of the foreign matter may be changed with the passage of movement time.

The detected air bubble information 2350 includes an entry of a set of tracking ID 23501 and pointer 23502, an entry of determination result 23503, and an entry of visualized image 23504. In the item of the tracking ID 23501, the tracking ID 2332 of the detected air bubble is set. In the item of the pointer 23502, a pointer to the movement locus information 23505 of the detected air bubble is set. The movement locus information 23505 is a copy of the movement locus information 2334 at the time of tracking of the detected air bubble. That is to say, the movement locus information 23505 includes an entry composed of a set of time 235051 and position information 235052 corresponding to the entry composed of the set of the time 23341 and the position information 23342 in the movement locus information 2334. In the entry of the determination result 23503, a text representing that the determination result is "air bubble". In the entry of the determination result 23503, a probability of the determination result may further be set.

Figure 7:
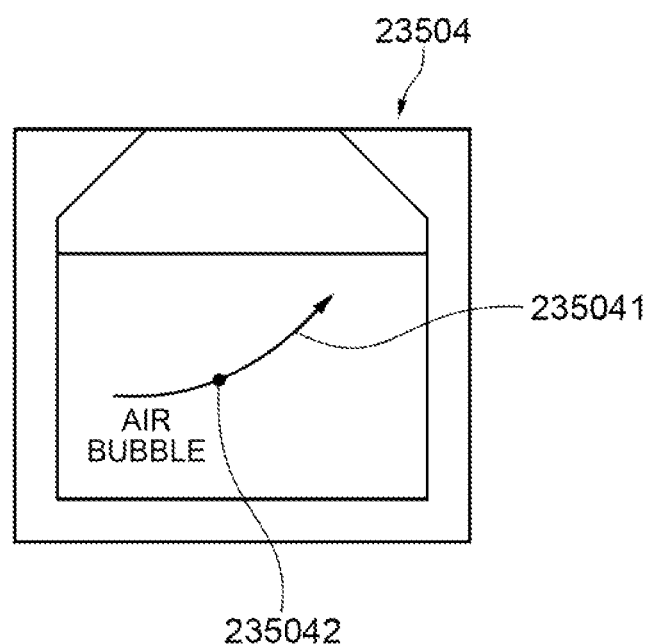
FIG. 7 is a schematic diagram showing an example of an image that visualizes movement locus information of an air bubble in the first example embodiment of the present invention.

In the entry of the visualized image 23504, an image that visualizes the movement locus information 23505 of the detected air bubble is set. The number of the visualized images 23504 may be any number as long as it is one or more. FIG. 7 is a schematic diagram showing an example of the image that visualizes the movement locus information 23505 of the detected air bubble. The visualized image 23504 in this example is obtained by superimposing a camera image used as a background image and a line image 235041 representing the movement locus of an air bubble. In FIG. 7, an image portion other than the line image 235041 corresponds to the camera image used as the background. As the camera image used as the background, for example, a specific frame image in which the detected air bubble is shown may be used. As the specific frame image, a frame image at any point of time during a period of tracking the detected air bubble, for example, a frame image at the tracking start time, the tracking intermediate time, or the tracking end time may be used. Moreover, the position 235042 of the air bubble shown in the camera image may be highlighted so as to be easy to notice. Possible highlighting methods are edge enhancement, coloring, rectangle display, and the like. Moreover, in FIG. 7, it is drawn with characters whether the visualized image belongs to a class of foreign matter or a class of an air bubble. However, the class information may be drawn by changing the color of a rectangle to be highlighted in accordance with the class, instead of drawing with characters. Moreover, an arrow indicating the moving direction of the air bubble is added to the line image 235041 indicating the movement locus of the air bubble. However, an aspect of indicating the moving direction of the air bubble is not limited to the arrow. For example, the line type, width and the like of the line representing the movement locus of the air bubble may be changed with the passage of movement time.

Referring to FIG. 2 again, the operation processing unit 240 has a microprocessor such as an MPU and a peripheral circuit thereof, and is configured to load the program 231 from the storage unit 230 and execute to make the above hardware and the program 231 cooperate and implement various processing units. Major processing units implemented by the operation processing unit 240 include an acquisition unit 241, a detection unit 242, a tracking unit 243, a determination unit 244, a storage control unit 245, and a display control unit 246.

When given an inspection start instruction including the container ID of the container 400 to be inspected from an external device through the operation input unit 220 or the communication I/F unit 210, the acquisition unit 241 starts an operation. Upon starting the operation, the acquisition unit 241 first starts up the grasping device 110 grasping the inspection target container 400 in the upright posture to tilt, swing, or rotate the inspection target container 400. When a certain period of time has elapsed after startup, the acquisition unit 241 stops the grasping device 110 to make the container 400 keep still in a predetermined posture. By thus tilting, swinging, or rotating the container 400 for a certain period of time and then making the container 400 keep still, a state in which the liquid moves in the still container 400 is obtained. Next, the acquisition unit 241 starts an operation to image the liquid moving in the inspection target container 400 consecutively at a predetermined frame rate with the camera device 130 under transmissive light emitted by the lighting device 120. That is to say, assuming time when the container 400 keeps still after tilted, swung, or rotated is time Ts, the acquisition unit 241 starts the abovementioned imaging operation at the time Ts.

The acquisition unit 241 can set the above predetermined frame rate to, for example, 150 to 200 fps, but may set to a frame rate other than the above example. Moreover, the acquisition unit 241 may set the above predetermined frame rate to a frame rate determined by the difference in specific gravity between foreign matter to be detected in the container 400 and the liquid in the container (hereinafter simply referred to as the difference in specific gravity). For example, the acquisition unit 241 has a correspondence table between the difference in specific gravity and the frame rate. Then, the acquisition unit 241 inputs the difference in specific gravity from the user, for example, through the operation input unit 220, acquires a frame rate corresponding to the input difference in specific gravity from the correspondence table, and sets the acquired frame rate for the camera device 130. The configuration of the correspondence table may be any configuration. For example, the correspondence table may hold a correspondence relation such that the frame rate is 100 fps when the absolute value of the difference in specific gravity is less than 0.2, 125 fps when the absolute value of the difference in specific gravity is 0.2 or more and less than 0.5, 150 fps when the absolute value of the difference in specific gravity is 0.5 or more and less than 1.0, 200 fps when the absolute value of the difference in specific gravity is 1.0 or more and less than 2.0, and 300 fps when the absolute value of the difference in specific gravity is 2.0 or more. However, the correspondence table may hold a correspondence relation between the difference in specific gravity and the frame rate other than the above example, and the number of stages of the difference in specific gravity does not need to be five.

Further, the acquisition unit 241 continues to image the liquid in the container 400 with the camera device 130 consecutively from the time Ts to time Te at which a predetermined period of time Tw elapses. For example, the predetermined period of time Tw may be set equal to or more than a period of time required to obtain a movement locus such that, assuming all the suspended matters suspended in the liquid are air bubbles, all the air bubbles move upward in the container 400 and are no longer considered to move downward (hereinafter, referred to as a minimum imaging time length). The minimum imaging time length may be determined in advance by experiments or the like and fixedly set for the acquisition unit 241. When the time Te is reached, the acquisition unit 241 may immediately stop the imaging with the camera device 130, or may still continue the imaging with the camera device 130.

Further, the acquisition unit 241 is configured to assign imaging time and a container ID to each of the chronological frame images acquired from the camera device 130 and store as the image information 232 into the storage unit 230.

The detection unit 242 is configured to, when chronological frame images for a predetermined time length are acquired by the acquisition unit 241, detect the shadow of suspended matter in the liquid in the container 400 from each of the frame images. For example, the detection unit 242 detects the shadow of suspended matter in the liquid by a method as described below. However, the detection unit 242 may detect the shadow of suspended matter in the liquid by a method other than the following method.

First, the detection unit 242 performs a binarization process on the respective frame images to generate binarized frame images. Next, the detection unit 242 detects the shadow of suspended matter from each of the binarized frame images in the following manner.

The detection unit 242 first sets a binarized frame image from which the shadow of suspended matter is to be detected as a binarized frame image of interest. Next, the detection unit 242 generates a difference image between the binarized frame image of interest and a binarized frame image having been imaged Δt later. Here, Δt is set to a period of time such that the same suspended matters partially overlap in the two images or appear at very close positions even if not overlap. Therefore, the time difference Δt is determined in accordance with the properties and movement conditions of the liquid and foreign matter. In the difference image, matching image portions in the two binarized frame images are erased, and only different image portions are left. Thus, the contour, scratch and the like of the container 400 appearing at the same positions in the two binarized frame images are erased, and only the shadow of the suspended matter appears. The detection unit 242 detects the shadow in the binarized frame image of interest corresponding to a location where the shadow appears in the difference image as the shadow of the suspended matter existing in the binarized frame image of interest. The result of detection of suspended matter for each binarized frame image detected by the detection unit 242 is transmitted to the tracking unit 243.

The tracking unit 243 tracks the suspended matter detected by the detection unit 242 in the chronological images, and generates the tracking information 233 in accordance with the result of tracking. First, the tracking unit 243 initializes the tracking information 233. In this initialization, the container ID of the container 400 to be inspected is set in the entry of the container ID 2331 in FIG. 4. Next, the tracking unit 243 tracks the suspended matter in the chronological images by a method as described below, and generates the entry of the set of the tracking ID 2332 and the pointer 2333 and the movement locus information 2334 for each suspended matter in accordance with the result of tracking.

First, the tracking unit 243 focuses on a binarized frame image having the earliest imaging time among the chronological binarized frame images generated by the detection unit 242. Next, the tracking unit 243 assigns a unique tracking ID to each suspended matter detected in the binarized frame image of interest. Next, the tracking unit 243 sets the tracking ID assigned to the suspended matter detected in the binarized frame image of interest into the item of the tracking ID 2332 in FIG. 4, sets the imaging time of the binarized frame image of interest into the item of the time 23341 of the top entry of the movement locus information 2334 indicated by the corresponding pointer 2333, and sets the coordinates of the suspended matter in the binarized frame image of interest into the item of the position information 23342.

Next, the tracking unit 243 compares the position of suspended matter detected in a binarized frame image one frame after the binarized frame image of interest (hereinafter referred to as the subsequent binarized frame image) with the position of the suspended matter detected in the binarized frame image of interest. Next, in a case where there are suspended matters such that a distance between the suspended matters is equal to or less than a predetermined threshold value, the tracking unit 243 determines that the suspended matter detected in the binarized frame image of interest and the suspended matter detected in the subsequent binarized frame image that have a distance equal to or less than the threshold value are the same suspended matters. In this case, the tracking unit 243 assigns the track ID assigned to the suspended matter determined to be the same suspended matter, to the suspended matter detected in the subsequent binarized frame image. Then, the tracking unit 243 secures a new entry in the movement locus information 2334 pointed to by the pointer 2333 in the entry of the tracking information 233 to which the assigned tracking ID 2332 is set, and sets the imaging time of the subsequent binarized frame image and the coordinate values of the suspended matter in the subsequent binarized frame image to the time 23341 and the position information 23342 in the secured entry.

On the other hand, in a case where suspended matter such that a distance from the suspended matter detected in the subsequent binarized frame image is equal to or less than the predetermined threshold value does not exist in the binarized frame image of interest, the tracking unit 243 determines that the suspended matter detected in the subsequent binarized frame image is new suspended matter, and assigns a new tracking ID thereto. Next, the tracking unit 243 sets, for each of the detected new suspended matters, the tracking ID assigned to the suspended matter detected in the subsequent binarized frame image into the item of the tracking ID 2332 of FIG. 4 of a newly secured entry, sets the imaging time of the subsequent binarized frame image into the item of the time 23341 of the top entry of the movement locus information 2334 indicated by the corresponding pointer 2333, and sets the coordinate values of the suspended matter in the subsequent binarized frame image into the item of the position information 23342.

When the tracking unit 243 finishes assigning tracking IDs to all the suspended matters detected in the subsequent binarized frame image, the tracking unit 243 next focuses on the subsequent binarized frame image, handles the subsequent binarized frame image being focused on as a new binarized frame image of interest, and repeats the same processing as described above. When the tracking unit 243 finishes focusing on all the frame images up to the last one in the image information 232, the tracking unit 243 ends the tracking process.

In the above description, the tracking unit 243 performs the tracking based on the distance between suspended matters in two adjacent frame images. However, the tracking unit 243 may perform the tracking based on the distance between suspended matters in two frame images adjacent to each other across n frames (n is a positive integer of 1 or more). Moreover, the tracking unit 243 may perform the tracking by comprehensively determining a tracking result of tracking based on the distance between suspended matters in two frame images adjacent to each other across m frames (m is a positive integer of 0 or more) and a tracking result of tracking based on the distance between suspended matters in two frame images adjacent to each other across m+j frames (j is a positive integer of 1 or more).

The determination unit 244 retrieves the tracking information 233 from the storage unit 230, and determines whether the suspended matter is foreign matter or an air bubble based on the movement locus information 2334 of the suspended matter included in the tracking information 233. For example, the determination unit 244 first focuses on the top entry of the tracking information 233. Next, the determination unit 244 sets the tracking ID 2332 in the entry of interest as a tracking ID of interest, and sets the movement locus information 2334 pointed to by the pointer 2333 in the entry of interest as movement locus information of interest. Next, the determination unit 244 determines, based on the movement locus of the suspended matter specified by the set of the time 23341 and the position information 23342 recorded in the movement locus information 2334 of interest, whether the suspended matter is foreign matter or an air bubble. Then, the determination unit 244 accumulates therein the determination result in association with the tracking ID of interest.

Whether suspended matter is foreign matter or an air bubble can be determined based on the movement locus of the suspended matter, because the characteristics of the movement locus of foreign matter in a liquid and the characteristics of the movement locus of an air bubble are different. That is to say, an air bubble, which has an overwhelmingly smaller specific gravity than a liquid, has a strong tendency to move in the anti-gravitational direction in a liquid. On the other hand, foreign matter, which has a greater specific gravity than an air bubble, does not have a strong tendency to move in the anti-gravitational direction in a liquid. In particular, foreign matter having a specific gravity greater than that of a liquid has a strong tendency to move in the gravitational direction in a liquid. For this reason, suspended matter that draws a locus of moving in the anti-gravitational direction in a liquid can be determined as an air bubble, and suspended matter that does not draw such a locus can be determined as foreign matter.

Various specific methods can be considered for the determination unit 244 to determine whether or not suspended matter is an air bubble based on the movement locus of the suspended matter. For example, the determination unit 244 inputs the movement locus (time-series data of position) of suspended matter into a trained model having been trained by machine learning for estimating whether suspended matter is an air bubble or foreign matter from the movement locus of the suspended matter. Then, the determination unit 244 acquires an estimated probability that the movement locus of the suspended matter is the movement locus of an air bubble from the trained model. Next, the determination unit 244 compares the estimated probability with predetermined upper threshold value THH and lower threshold value THL. Next, when the estimated probability is higher than the upper threshold value THH, the determination unit 244 determines that the suspended matter is an air bubble. On the other hand, when the estimated probability is lower than the lower threshold value THL, the determination unit 244 determines that the suspended matter is foreign matter with a high probability. Moreover, when the estimated probability is equal to or lower than the upper threshold value THH and equal to or higher than the lower threshold value THL, the determination unit 244 prioritizes safety and determines that the suspended matter is foreign matter with a low probability. The trained model can be generated in advance by, for example, machine learning using a machine learning algorithm such as a neural network using the movement loci of various air bubbles and foreign matters in the container 400 as training data. However, the method for determining whether suspended matter is foreign matter or an air bubble based on the movement locus of the suspended matter is not limited to the above one. The determination may be made in accordance with the result of matching the pattern of the movement locus of suspended matter with the patterns of the movement loci of an air bubble and foreign matter defined in advance by a method such as pattern matching.

When the determination unit 244 finishes determination whether the suspended matter with the tracking ID of interest is foreign matter or an air bubble, the determination unit 244 next focuses on suspended matter with a tracking ID of the next entry in the tracking information 233, and repeats the same processing as the above processing. Then, when the determination unit 244 finishes focusing on all the tracking IDs up to a tracking ID of the last entry in the tracking information 233, the determination unit 244 transmits the determination result for each of the tracking IDs accumulated therein to the storage control unit 245.

The storage control unit 245 generates the inspection result information 234 corresponding to the determination result of each tracking ID transmitted by the determination unit 244, and stores into the storage unit 230. For example, the storage control unit 245 first generates the initialized inspection result information 234 in the storage unit 230, and sets the container ID 2331 of the tracking information 234 into the entry of the container ID 2341 of that inspection result information 234. Next, the storage control unit 245 counts the total number of suspended matters determined to be foreign matter in the result of determination by the determination unit 244. When the counted value is 0, the storage control unit 245 sets OK (passed inspection) in the entry of the inspection result 2342 of the inspection result information 234, and sets a value 0 in the entry of the number of detected foreign matters 2343. On the other hand, when the total number of the suspended matters determined to be foreign matter is 1 or more, the storage control unit 245 sets NG (failed inspection) in the entry of the inspection result 2342 of the inspection result information 234, and sets the total number of the suspended matters determined to be foreign matter in the entry of the number of detected foreign matters 2343. Next, the storage control unit 245 counts the total number of suspended matters determined to be air bubble in the result of determination by the determination unit 244, and sets the counted value in the entry of the number of detected air bubbles 2344 of the inspection result information 234.

Next, the storage control unit 245 generates, for each suspended matter determined to be foreign matter, an entry of a set of the detected foreign matter ID 2345 and the pointer 2346 and the detected foreign matter information 2349 pointed to by the pointer 2346 in the inspection result information 234. Moreover, the storage control unit 245 sets, in the item of the detected foreign matter ID 2345, an ID such as a serial number for discriminating the foreign matter detected in the inspection target container 400 identified by the container ID 2341 from other foreign matter. Moreover, the storage control unit 245 sets the tracking ID 2332 assigned to the suspended matter determined to be foreign matter in the tracking information 233, in the item of the tracking ID 23491 of the detected foreign matter information 2349. Moreover, the storage control unit 245 sets a pointer to the movement locus information 23495 in the item of the pointer 23492. Moreover, the storage control unit 245 sets a copy of the movement locus information 2334 generated in the tracking information 233 for the suspended matter determined to be foreign matter, in the movement locus information 23495. Moreover, the storage control unit 245 sets, in the entry of the determination result 23493, a text (for example, a character string "FOREIGN MATTER!") representing that the suspended matter is determined to be foreign matter with a high probability, or a text (for example, a character string "FOREIGN MATTER?") representing that the suspended matter is determined to be foreign matter with a low probability.

Further, the storage control unit 245 sets, in the entry of the visualized image 23494, a visualized image generated by superimposing an image of a movement locus specified by the time series of the position information 234952 in the movement locus information 23495 on a background image that is a specific frame image searched from the image information 232 using a set of the tracking start time, tracking intermediate time or tracking end time of the time 234951 set in the movement locus information 23495 and the container ID 2341 as a search key. For example, the storage control unit 245 generates and stores the visualized image 23494 generating by superimposing the movement locus of foreign matter on a camera image as shown in FIG. 6.

Next, the storage control unit 245 generates, for each suspended matter determined to be an air bubble, an entry of the set of the detected air bubble 2347 and the pointer 2348 and the detected air bubble information 2350 pointed to by the pointer 2348 in the inspection result information 234. Moreover, the storage control unit 245 sets, in the item of the detected air bubble ID 2347, an ID such as a serial number for discriminating an air bubble detected in the inspection target container 400 identified by the container ID 2341 from another air bubble. Moreover, the storage control unit 245 sets the tracking ID 2332 assigned to the suspended matter determined to be an air bubble in the tracking information 233, into the item of the tracking ID 23501 of the detected air bubble information 2350. Moreover, the storage control unit 245 sets a pointer to the movement locus information 23505 in the item of the pointer 23502. Moreover, the storage control unit 245 sets a copy of the movement locus information 2334 generated in the tracking information 233 for the suspended matter determined to be an air bubble, in the movement locus information 23505. Moreover, the storage control unit 245 sets, in the entry of the determination result (air bubble) 23503, a text (for example, a character string "AIR BUBBLE!") representing that the suspended matter is an air bubble.

Further, the storage control unit 245 sets, in the entry of the visualized image 23504, a visualized image generated by superimposing an image of a movement locus specified by the time series of the position information 235052 in the movement locus information 23505 on a background image that is a specific frame image searched from the image information 232 using a set of the tracking start time, tracking intermediate time or tracking end time of the time 235051 set in the movement locus information 23505 and the container ID 2341 as a search key. For example, the storage control unit 245 generates and stores the visualized image 23504 generated by superimposing the movement locus of an air bubble on a camera image as shown in FIG. 7.

The display control unit 246 controls the display device 300 to display the inspection result information 234. As part of the inspection of the container 400, the display control unit 246 controls the display device 300 to display the inspection result information 234 at the timing when the result of inspection of the container 400 is obtained. Moreover, the display control unit 246 controls the display device 300 to display the inspection result information 234 of the container 400 asynchronously with the inspection of the container 400 in accordance with an instruction from outside. The former display form is referred to as a display during inspection, and the latter display form is referred to as a display after inspection.

Display During Inspection

The display control unit 246 automatically starts the display during inspection as soon as the storage control unit 245 generates the inspection result information 234 for the inspection target container 400. First, the display control unit 246 retrieves the inspection result information 234 from the storage unit 230. Next, the display control unit 246 generates an inspection result display screen based on the retrieved inspection result information 234. Next, the display control unit 246 causes the display device 300 to display the generated inspection result display screen.

Figure 8:
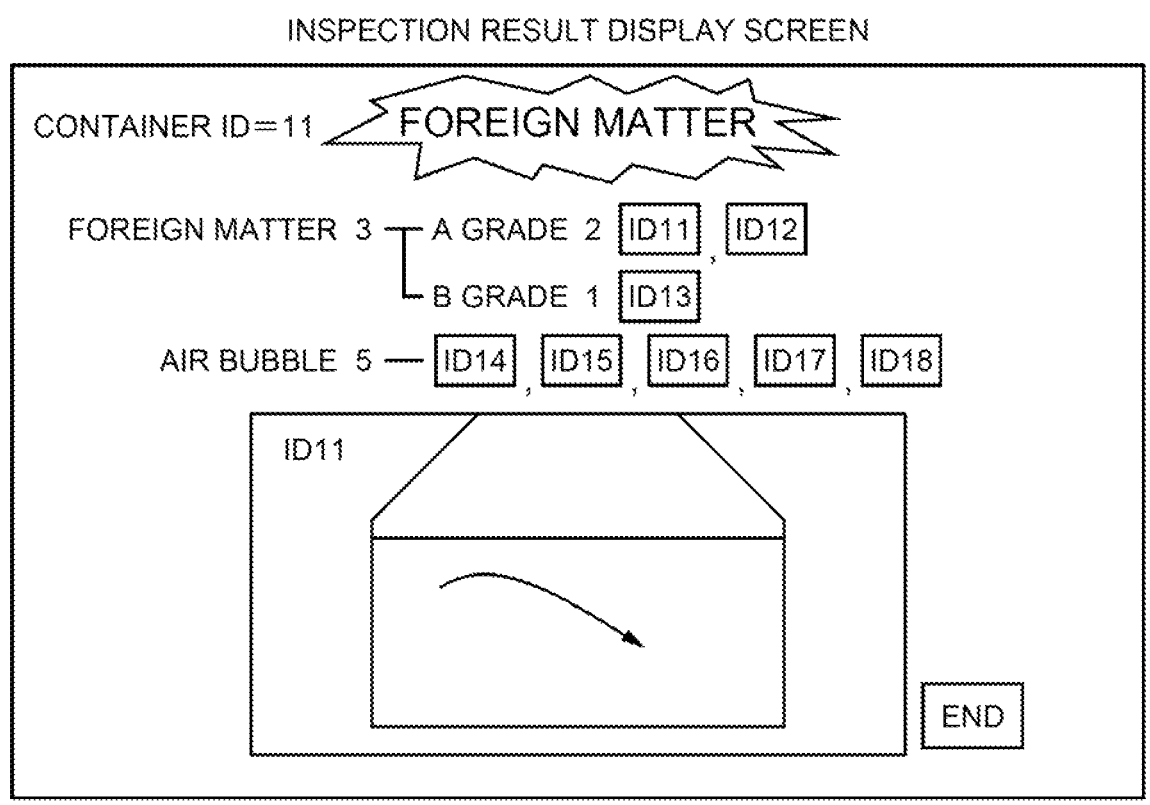
FIG. 8 is a view showing an example of an inspection result display screen displayed on a display device as part of inspection in the first example embodiment of the present invention.

FIG. 8 shows an example of the inspection result display screen displayed by the display device 300 in the display during inspection. In this example, the display control unit 246 displays, on the inspection result display screen, a container ID set in the container ID 2341, an inspection result set in the inspection result 2342 (the illustrated example represents the presence of foreign matter), the total number of foreign matters set in the number of detected foreign matters 2343, and the total number of air bubbles set in the number of detected air bubbles 2344. Moreover, in the example shown in FIG. 8, the display control unit 246 classifies foreign matter IDs set in the detected foreign matter ID 2345 into an A-grade group determined to be foreign matter with a high probability and a B-grade group determined to be foreign matter with a low probability in accordance with a determination probability set in the determination result 23493, and displays on the inspection result display screen. The display control unit 246 displays both the groups in a manner that the foreign matter IDs are sorted in ascending or descending order of estimated probability.

Further, in the example shown in FIG. 8, the display control unit 246 sorts air bubble IDs set in the detected air bubble ID 2347 in ascending or descending order of estimated probability, and displays on the inspection result display screen. Moreover, in the example shown in FIG. 8, the display control unit 246 displays, for example, the visualized image 23494 with the foreign matter ID of suspended matter determined to be foreign matter with a highest probability from the A-grade group of foreign matters on the inspection result display screen. Moreover, when detecting that a predetermined operation such as double-clicking is performed on any foreign matter ID or air bubble ID displayed on the inspection result display screen, the display control unit 246 retrieves the visualized image 23494 with the foreign matter ID or air bubble ID on which the predetermined operation is performed from the inspection result information 234, and displays the retrieved visualized image 23494 on the inspection result display screen, instead of the visualized image currently displayed on the inspection result display screen. Moreover, an end button is displayed on the inspection result display screen. When detecting that a predetermined operation such as double-clicking is performed on the end button, the display control unit 246 ends the display during inspection.

Display After Inspection

The display control unit 246 starts control of the display after inspection on the occasion of an instruction input from an external device via the operation input unit 220 or the communication I/F unit 210 when there is a need to confirm the inspection result at any point of time after the inspection of the container 400, for example, at a point of time before or after shipment of the container 400 filled with a liquid as a product. First, the display control unit 246 inputs a container ID to be displayed through the operation input unit 220 or the like together with or separately from the instruction. Next, using the input container ID as a search key, the display control unit 246 searches for the inspection result information 234 having the container ID 2341 that matches the container ID of the search key, and retrieves the inspection result information 234 from the storage unit 230.

Next, the display control unit 246 generates an inspection result display screen based on the retrieved inspection result information 234. An operation that the display control unit 246 generates the inspection result display screen based on the inspection result information 234 and displays on the display device 300 is the same as in the display during inspection.

Figure 9:
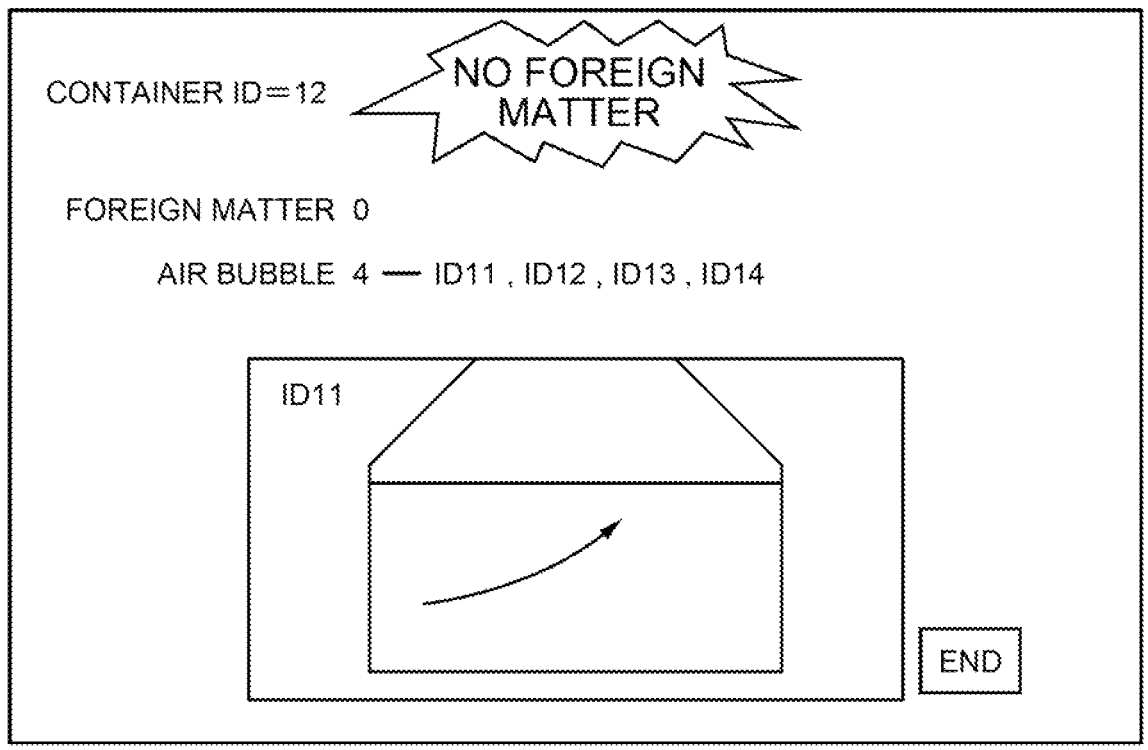
FIG. 9 is a view showing an example of an inspection result display screen displayed on the display device in accordance with a request by a user at any point of time after inspection in the first example embodiment of the present invention.

FIG. 9 shows an example of the inspection result display screen displayed by the display device 300 in the display after inspection. In this example, the display control unit 246 displays, on the inspection result display screen, a container ID set in the container ID 2341, an inspection result set in the inspection result 2342 (the illustrated example indicates the absence of foreign matter), the total number of foreign matters set in the number of detected foreign matters 2343 (0 in the illustrated example), and the total number of air bubbles set in the number of detected air bubbles 2344. Moreover, in the example shown in FIG. 9, the display control unit 246 sorts air bubble IDs set in the detected air bubble ID 2347 in ascending or descending order of estimated probability, and displays on the inspection result display screen. Moreover, in the example shown in FIG. 9, the display control unit 246 displays, for example, the visualized image 23504 with the air bubble ID of suspended matter determined to be an air bubble with a lowest probability from the displayed air bubble IDs, on the inspection result display screen. Moreover, when detecting that a predetermined operation such as double-clicking is performed on any air bubble ID displayed on the inspection result display screen, the display control unit 246 retrieves the visualized image 23504 with the air bubble ID on which the predetermined operation is performed from the inspection result information 234, and displays the retrieved visualized image 23504 on the inspection result display screen, instead of the visualized image currently displayed on the inspection result display screen. Moreover, an end button is displayed on the inspection result display screen. When detecting that a predetermined operation such as double-clicking is performed on the end button, the display control unit 246 ends the display after inspection.

In the above description, the display control unit 246 performs the display during inspection as part of the inspection at all times regardless of the result of inspection of the container 400. However, the display control unit 246 may determine whether or not to perform the display during inspection in accordance with the result of inspection of the container 400. For example, the display control unit 246 may perform the display during inspection limitedly on the container 400 whose inspection result is NG, that is, the container 400 determined to contain foreign matter. In this case, the display during inspection is not performed as part of the inspection on the container 400 determined to contain no foreign matter. Alternatively, the display control unit 246 may perform the display during inspection limitedly on the container 400 whose inspection result is NG and for which a text representing foreign matter with a low probability is set in the foreign matter determination result 23493. In this case, the display during inspection is not performed as part of the inspection on the container 400 determined to contain no foreign matter or the container 400 whose inspection result is NG and for which a text representing foreign matter with a high probability is set in the foreign matter determination result 23493.

Further, in the display during inspection and the display after inspection, the display control unit 246 may perform various displays on the display device 300 as further described below.

- Display the movement loci of all the suspended matters (foreign matters and air bubbles) detected in the inspection of the container 400.
- Display the movement loci of all the suspended matters (foreign matters and air bubbles) belonging to a class (foreign matter or air bubble) designated by the user among all the suspended matters (foreign matters and air bubbles) detected in the inspection of the container 400.
- Display only the movement locus of suspended matter designated by the user from among all the suspended matters (foreign matters or air bubbles) belonging to the class (foreign matter or air bubble) designated by the user among all the suspended matters (foreign matters and air bubbles) detected in the inspection of the container 400.
- In the display of the moving locus of the suspended matter described above, the user can designate the section of the movement locus to be displayed. As designation of the section of the movement locus, for example, it is conceivable to designate the section from the tracking start point to the tracking end point, or designate the range of the imaging time.

In the display of the movement locus of the suspended matter described above, the movement locus is displayed while the video is being played. At the time, the user can perform designation of play or stop, change of play speed, designation of play direction (forward or reverse), designation of frame advance, skip to the tracking start point of time or the tracking end point of time, and the like.

In the display of the movement locus of the suspended matter described above, the class information (foreign matter or air bubble) of the suspended matter is displayed in the vicinity of the shadow of the suspended matter by characters, or displayed by the color of the shadow, or displayed by the line type of the locus.

In the display of the movement locus of the suspended matter described above, for example, a black background is used as the background image instead of a specific frame image, and only the movement locus of the suspended matter is displayed in white.

Next, an overall operation of the inspection system 100 according to this example embodiment will be described.

Figure 10:
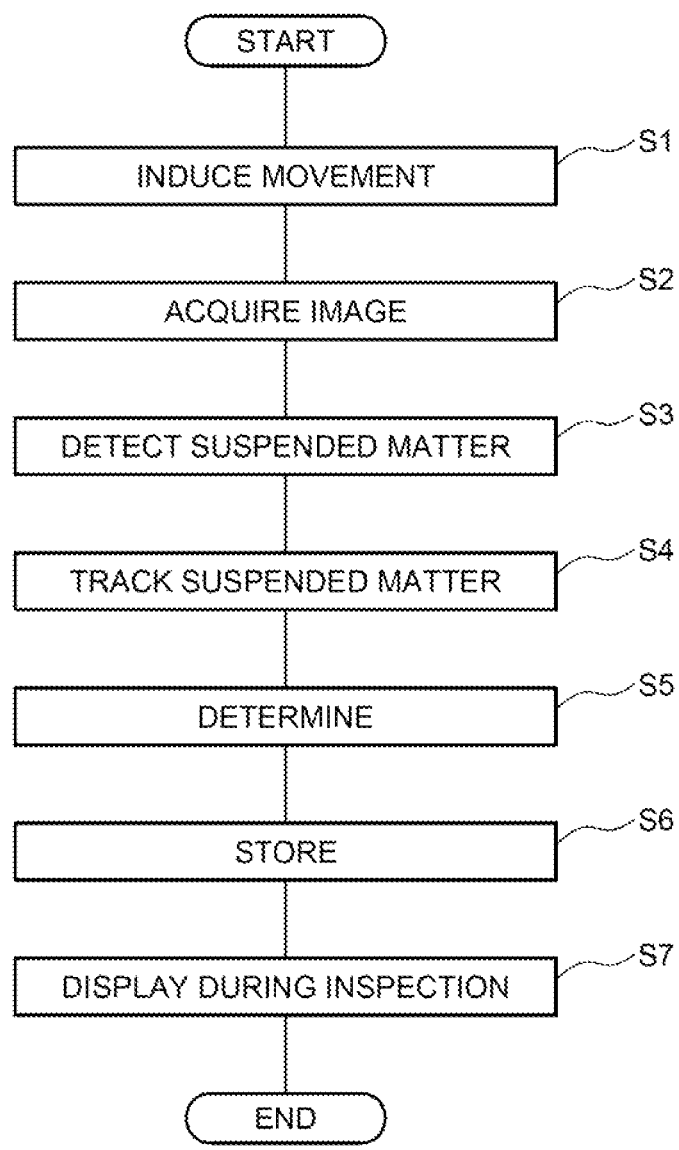
FIG. 10 is a flowchart showing an example of an operation performed by the inspection system from the start of inspection to the end of inspection on one container in the first example embodiment of the present invention.

FIG. 10 is a flowchart showing an example of an operation of the inspection system 100 from the start of inspection to the end of inspection for one container 400. When there are a plurality of containers 400 to be inspected, the inspection system 100 repeatedly executes the processing shown in FIG. 10 for each of the containers 400. The inspection system 100 starts inspection in a state that the grasping device 110 is grasping the inspection target container 400 in the upright posture.

First, the acquisition unit 241 induces the movement of the liquid inside the container 400 (step S1). Specifically, the acquisition unit 241 tilts, swings, or rotates the container 400 with the grasping device 110, and then makes the container 400 keep still in the upright posture. Next, the acquisition unit 241 consecutively images the liquid in the container 400 with the camera device 130 under transmissive light emitted by the lighting device 120, and then acquires chronological images captured at a predetermined frame rate over a predetermined length of time (step S2). The chronological images acquired from the camera device 130 by the acquisition unit 241 are stored in the storage unit 230 as the image information 232. As illustrated in FIG. 3, the image information 232 includes an entry composed of a set of the container ID 2321, the imaging time 2322, and the frame image 2323.

Next, the detection unit 242 detects suspended matter present in the liquid in the chronological images included in the image information 232 (step S3). Next, the tracking unit 243 tracks the suspended matter detected by the detection unit 242 in the chronological images included in the image information 232 (step S4). The tracking results of the respective suspended matters tracked by the tracking unit 243 are stored in the storage unit 230 as the tracking information 233. As illustrated in FIG. 4, the tracking information 233 includes the movement locus information 2334 of each suspended matter to be tracked.

Next, the determination unit 244 determines for each suspended matter specified by the tracking ID 2332 included in the tracking information 233 whether the suspended matter is foreign matter or an air bubble based on the movement locus information 2334 of the suspended matter (step S5). Next, the storage control unit 245 stores the determination result of each suspended matter determined by the determination unit 244 as the inspection result information 234 into the storage unit 230 (step S6). As illustrated in FIG. 5, the inspection result information 234 includes the container ID 2341, the inspection result 2342, the number of detected foreign matters 2343, the number of detected air bubbles 2344, the detected foreign matter information 2349 and the movement locus information 23495 used as the basis for determination of each detected foreign matter, and the detected air bubble information 2350 and the movement locus information 23505 used as the basis for determination of each detected air bubble.

Next, the display control unit 246 displays the inspection result information 234 of the container 400 on the display device 300 as part of the inspection of the container 400 (step S7). On the inspection result display screen illustrated in FIG. 8, the container ID, the inspection result indicating the presence of foreign matter in characters, the total number of detected foreign matters, the foreign matter ID of A grade determined to be foreign matter with a high probability, the foreign matter ID of B grade determined to be foreign matter with a low probability, the total number of detected bubbles and the air bubble ID of each of the air bubbles, and the visualized image of the movement locus information used as the basis for foreign matter determination of a typical foreign matter are displayed. When a predetermined operation such as double-clicking is performed by the user on any one of the foreign matter IDs, the display control unit 246 retrieves the visualized image 23494 from the detected foreign matter information 2349 corresponding to the foreign matter ID on which the operation is performed, and displays the retrieved visualized image 23494 instead of the visualized image currently displayed on the inspection result display screen. Thus, the user can confirm, for all the foreign matters, the visualized images of the movement loci that are the basis for the determination thereof, on the inspection result display screen. Moreover, when a predetermined operation such as double-clicking is performed by the user on any one of the air bubble IDs, the display control unit 246 retrieves the visualized image 23504 from the detected air bubble information 2350 corresponding to the air bubble ID on which the operation is performed, and displays the retrieved visualized image 23504 instead of the visualized image currently displayed on the inspection result display screen. Thus, the user can confirm, for all the air bubbles, the visualized images of the movement loci that are the basis for the determination thereof, on the inspection result display screen.

Figure 11:
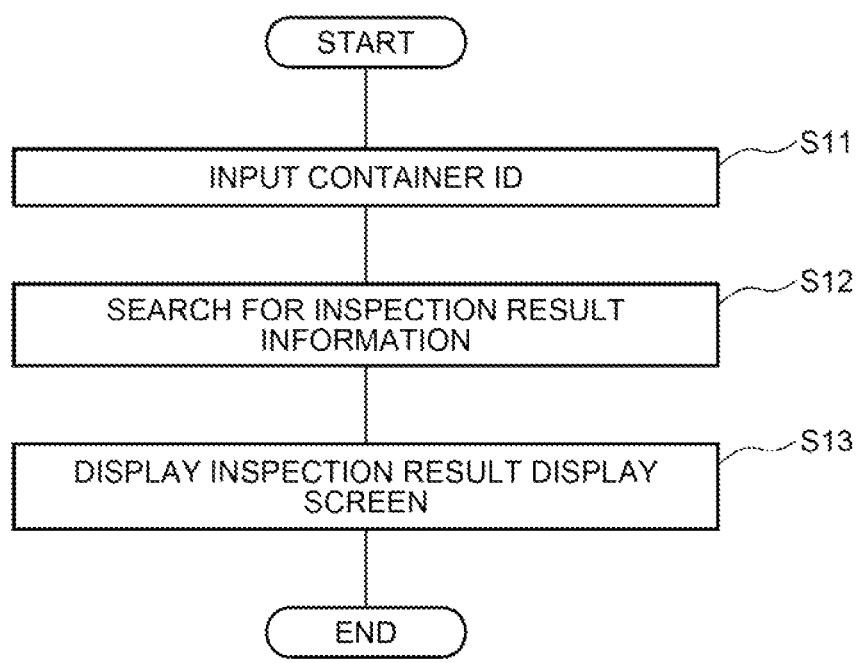
FIG. 11 is a flowchart showing an example of a post-inspection display operation in the first example embodiment of the present invention.

FIG. 11 is a flowchart showing an example of the display operation after inspection of the inspection system 100. The inspection system 100 starts processing shown in FIG. 11 on the occasion of an instruction of display after inspection input from an external device via the operation input unit 220 or the communication I/F unit 210. First, the display control unit 246 inputs a container ID to be displayed through the operation input unit 220 or the like (step S11). Next, using the input container ID as a search key, the display control unit 246 searches the storage unit 230 for the search result information 234 having the container ID 2341 that matches the container ID of the search key (step S12).

Next, the display control unit 246 generates an inspection result display screen based on the search result information 234 obtained by search, and displays the inspection result display screen on the display device 300 (step S13). On the inspection result display screen illustrated in FIG. 9, the container ID, the inspection result indicating the absence of foreign matter in characters, a display that the total number of detected foreign matters is 0, a display that the total number of detected air bubbles is 4 and the respective air bubble IDs are ID11, ID12, ID13 and ID14, and a visualized image that visualizes movement locus information that is the basis for air bubble determination for a typical air bubble. When a predetermined operation such as double-clicking is performed by the user on any one of the air bubble IDs, the display control unit 246 retrieves the visualized image 23504 from the detected air bubble information 2350 corresponding to the air bubble ID on which the operation is performed, and displays the retrieved visualized image 23504 instead of the visualized image currently displayed on the inspection result display screen. Thus, the user can confirm, for all the air bubbles, the visualized images of the movement loci that are the basis for the determination on the inspection result display screen.

As described above, according to this example embodiment, it is possible to easily confirm the basis for the determination together with the determination result at any point of time after the inspection for each inspected container. The reason is that the inspection system 100 stores, in association with the container ID of the inspected container 400, the inspection result information 234 that includes the determination result as to whether suspended matter present in the liquid encapsulated in the container 400 is foreign matter or an air bubble and the information on the movement locus of the suspended matter that is the basis for the determination in the storage unit 230. Moreover, the reason is that the inspection system 100 causes the display device 300 to display the determination result of the container 400 stored in the storage unit 230 and the information of the movement locus of the suspended matter used as the basis for the determination at any point of time after the inspection.

Second Example Embodiment

Next, a second example embodiment of the present invention will be described with reference to FIG. 12. In this example embodiment, the overview of an inspection system of the present invention will be described.

Figure 12:
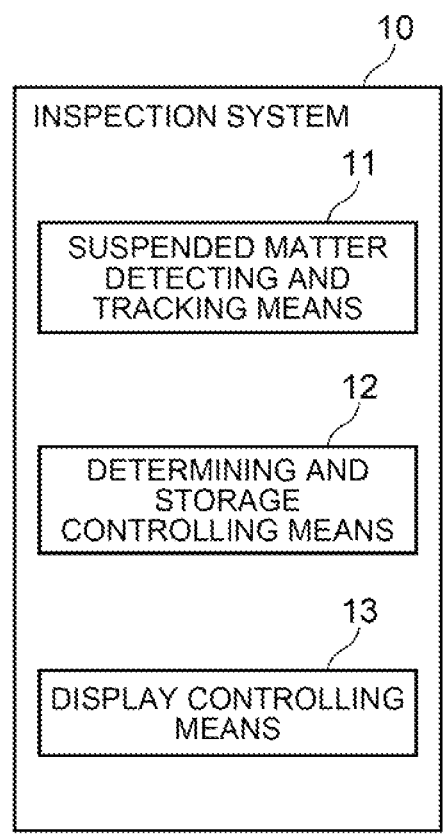
FIG. 12 is a block diagram of an inspection system according to a second example embodiment of the present invention.

Referring to FIG. 12, an inspection system 10 according to the second example embodiment is an inspection system that inspects the presence or absence of foreign matter in a liquid encapsulated in a container, and the inspection system 10 includes a suspended matter detecting and tracking means 11, a determining and storage controlling means 12, and a display controlling means 13.

The suspended matter detecting and tracking means 11 is configured to detect and track suspended matter present in a liquid in a container in chronological images obtained by consecutively imaging the liquid with a camera. The suspended matter detecting and tracking means 11 can include, for example, the acquisition unit 241, the detection unit 242 and the tracking unit 243 shown in FIG. 2, but is not limited thereto.

The determining and storage controlling means 12 is configured to determine, based on a movement locus of the suspended matter tracked by the suspended matter detecting and tracking means 11, whether the suspended matter is foreign matter or an air bubble, and store inspection result information including the result of determination and information of the movement locus of the suspended matter that is the basis for determination into a storing means in association with identification information of the container. The determining and storage controlling means 12 can include, for example, the determination unit 244 and the storage control unit 245 shown in FIG. 2, but is not limited thereto.

The display controlling means 13 is configured to cause a displaying means to display the result of the determination and the information of the movement locus of the suspended matter used as the basis for the determination included by the inspection result information. The display controlling means 13 can include, for example, the display control unit 246 shown in FIG. 2, but is not limited thereto.

The inspection system 10 thus configured operates in the following manner. That is to say, first, the suspended matter detecting and tracking means 11 detects and tracks suspended matter present in a liquid in a container in chronological images obtained by consecutively imaging the liquid with a camera. Next, the determining and storage controlling means 12 determines, based on a movement locus of the suspended matter tracked by the suspended matter detecting and tracking means 11, whether the suspended matter is foreign matter or an air bubble, and stores inspection result information including the result of the determination and information of the movement locus of the suspended matter used as the basis for the determination into the storing means in association with identification information of the container. Next, the display controlling means 13 causes the displaying means to display the result of the determination and the information of the movement locus of the suspended matter used as the basis for the determination included by the inspection result information.

As described above, according to this example embodiment, it is possible to easily confirm the result of determination and the basis for the determination at any point of time after the inspection for each inspected container. The reason is that the determining and storage controlling means 12 determines based on the movement locus of the suspended matter tracked by the suspended matter detecting and tracking means 11 whether the suspended matter is foreign matter or an air bubble, and stores inspection result information including the result of the determination and information of the movement locus of the suspended matter used as the basis for the determination into the storing means in association with the identification information of the container. Moreover, the display controlling means 13 causes the displaying means to display the result of the determination and information of the movement locus of the suspended matter used as the basis for the determination included by the inspection result information.

Although the present invention has been described above with reference to the example embodiments, the present invention is not limited to the example embodiments. The configurations and details of the present invention can be changed in various manners that can be understood by one skilled in the art within the scope of the present invention. For example, the present invention may include the following configuration.

For example, the inspection system may determine whether the suspended matter is foreign matter or an air bubble based on static information such as the image characteristics, size, and average brightness value of the flowing matter, in addition to the movement locus of the suspended matter. By determining the static information as described above in addition to motion information such as movement locus, it is possible to comprehensively determine the characteristics of foreign matter and air bubbles, so that high determination accuracy can be obtained. In this case, the static information used for determination may also be included in the information on the movement locus of the suspended matter and stored in the inspection result information.

Rather than starting tracking suspended matter in the liquid only after tilting, swinging or rotating the inspection target container and then making the inspection target container keep still, the inspection system may start tracking suspended matter in the liquid while tilting, swinging, or rotating. In this case, a frame rate for continuously imaging the tilting, swinging or rotating container with a camera is desirable to be sufficiently higher than a frame rate for imaging the foreign matter in the container in the still posture by the speed of the container moving by tilting, swinging or rotating. The posture of the container while tilting, swinging or rotating may be obtained from an encoder attached to a motor. The posture of the container may be detected by including a marker that moves in conjunction with the movement of the container in the field of view of the camera and detecting the posture of the container from the position of the marker in the frame image. Moreover, since a scratch or a stain on container moves in perfect conjunction with the tilt, swing and rotation of the container, a shadow that moves in perfect conjunction with the marker in the frame image may be detected as a scratch or a stain on the container.

The inspection result information may further include information of date and time when the inspection has been performed, or information such as the name of an inspector.

The present invention can be used for a field of detecting foreign matter in a liquid such as medicine or water encapsulated in a transparent or translucent container.

The whole or part of the example embodiments disclosed above can be described as, but is not limited to, the following supplementary notes.

Supplementary Note 1

An inspection system inspecting whether foreign matter is present or absent in a liquid encapsulated in a container, the inspection system comprising:
a suspended matter detecting and tracking means configured to detect and track suspended matter present in the liquid encapsulated in the container in chronological images obtained by consecutively imaging the liquid with a camera;
a determining and storage controlling means configured to determine, based on a movement locus of the tracked suspended matter, whether the suspended matter is foreign matter or an air bubble, and store inspection result information including a result of the determination and information of the movement locus of the suspended matter used as a basis for the determination into a storing means in association with identification information of the container; and
a display controlling means configured to cause a displaying means to display the result of the determination and the information of the movement locus of the suspended matter used as the basis for the determination included by the inspection result information.

Supplementary Note 2

The inspection system according to Supplementary Note 1, wherein
the display controlling means is configured to cause the displaying means to display a visualized image visualizing the information of the movement locus of the suspended matter.

Supplementary Note 3

The inspection system according to Supplementary Note 1 or 2, wherein
a time interval between the chronological images is determined in accordance with a difference in specific gravity between foreign matter to be detected in the container and the liquid encapsulated in the container.

Supplementary Note 4

The inspection system according to any of Supplementary Notes 1 to 3, wherein
the chronological images include chronological images obtained by consecutively imaging the liquid moving in the container keeping still in a predetermined posture after tilted, swung, or rotated.

Supplementary Note 5

The inspection system according to any of Supplementary Notes 1 to 4, wherein
the display controlling means is configured to, at any point of time after the inspection of the container ends, when the identification information of the container is input, acquire the inspection result information associated with the input identification information of the container from the storing means, and cause the displaying means to display the result of the determination and the information of the movement locus of the suspended matter used as the basis for the determination included by the acquired inspection result information.

Supplementary Note 6

The inspection system according to any of Supplementary Notes 1 to 5, wherein
the display controlling means is configured to, as part of the inspection of the container, as soon as possible after the inspection result information is stored, cause the displaying means to display the result of the determination and the information of the movement locus of the suspended matter used as the basis for the determination included by the stored inspection result information.

Supplementary Note 7

An inspection method for inspecting whether foreign matter is present or absent in a liquid encapsulated in a container, the inspection method comprising:
detecting and tracking suspended matter present in the liquid encapsulated in the container in chronological images obtained by consecutively imaging the liquid with a camera;
determining, based on a movement locus of the tracked suspended matter, whether the suspended matter is foreign matter or an air bubble;
storing inspection result information including a result of the determination and information of the movement locus of the suspended matter used as a basis for the determination into a storing means in association with identification information of the container; and
causing a displaying means to display the result of the determination and the information of the movement locus of the suspended matter used as the basis for the determination included by the inspection result information.

Supplementary Note 8

The inspection method according to Supplementary Note 7, comprising in the displaying, causing the displaying means to display a visualized image visualizing the information of the movement locus of the suspended matter.

Supplementary Note 9

The inspection method according to Supplementary Note 7 or 8, wherein
a time interval between the chronological images is determined in accordance with a difference in specific gravity between foreign matter to be detected in the container and the liquid encapsulated in the container.

Supplementary Note 10

The inspection method according to any of Supplementary Notes 7 to 9, wherein
the chronological images include chronological images obtained by consecutively imaging the liquid moving in the container keeping still in a predetermined posture after tilted, swung, or rotated.

Supplementary Note 11

The inspection method according to any of Supplementary Notes 7 to 10, comprising
in the displaying, at any point of time after the inspection of the container ends, when the identification information of the container is input, searching for and acquiring the inspection result information associated with the input identification information of the container from the storing means, and causing the displaying means to display the result of the determination and the information of the movement locus of the suspended matter used as the basis for the determination included by the acquired inspection result information.

Supplementary Note 12

The inspection method according to any of Supplementary Notes 7 to 11, comprising
in the displaying, as part of the inspection of the container, as soon as possible after the inspection result information is stored, causing the displaying means to display the result of the determination and the information of the movement locus of the suspended matter used as the basis for the determination included by the stored inspection result information.

Supplementary Note 13

A non-transitory computer-readable recording medium on which a program is recorded, the program comprising instructions for causing a computer inspecting whether foreign matter is present or absent in a liquid encapsulated in a container to perform processes to:
detect and track suspended matter present in the liquid encapsulated in the container in chronological images obtained by consecutively imaging the liquid with a camera;
determine, based on a movement locus of the tracked suspended matter, whether the suspended matter is foreign matter or an air bubble;
store inspection result information including a result of the determination and information of the movement locus of the suspended matter used as a basis for the determination into a storing means in association with identification information of the container; and
cause a displaying means to display the result of the determination and the information of the movement locus of the suspended matter used as the basis for the determination included by the inspection result information.

DESCRIPTION OF REFERENCE NUMERALS 100 inspection system
110 grasping device
120 lighting device
130 camera device
200 inspection apparatus
300 display device
400 container

What is claimed is:

1. An inspection apparatus inspecting whether foreign matter is present or absent in a liquid encapsulated in a container, the inspection apparatus comprising:
a memory containing program instructions; and
a processor coupled to the memory, wherein the processor is configured to execute the program instructions to:
detect and track suspended matter present in the liquid encapsulated in the container in chronological images obtained by consecutively imaging the liquid with a camera;
determine, based on a movement locus of the tracked suspended matter, whether the suspended matter is foreign matter or an air bubble;
store inspection result information including a result of the determination and information of the movement locus of the suspended matter used as a basis for the determination in association with identification information of the container; and
output the result of the determination and the information of the movement locus of the suspended matter used as the basis for the determination included by the inspection result information.

2. The inspection apparatus according to claim 1, wherein the processor is configured to execute the program instructions to
in the outputting, output a visualized image visualizing the information of the movement locus of the suspended matter.

3. The inspection apparatus according to claim 1, wherein a time interval between the chronological images is determined in accordance with a difference in specific gravity between foreign matter to be detected in the container and the liquid encapsulated in the container.

4. The inspection apparatus according to claim 1, wherein the chronological images include chronological images obtained by consecutively imaging the liquid moving in the container keeping still in a predetermined posture after tilted, swung, or rotated.

5. The inspection apparatus according to claim 1, wherein the processor is configured to execute the program instructions to
perform the outputting at any point of time after the inspection of the container ends.

6. The inspection apparatus according to claim 1, wherein the processor is configured to execute the program instructions to
perform the outputting as part of the inspection of the container, as soon as possible after performing the determination.

7. An inspection method for inspecting whether foreign matter is present or absent in a liquid encapsulated in a container, the inspection method comprising:

detecting and tracking suspended matter present in the liquid encapsulated in the container in chronological images obtained by consecutively imaging the liquid with a camera;

determining, based on a movement locus of the tracked suspended matter, whether the suspended matter is foreign matter or an air bubble;

storing inspection result information including a result of the determination and information of the movement locus of the suspended matter used as a basis for the determination in association with identification information of the container; and outputting the result of the determination and the information of the movement locus of the suspended matter used as the basis for the determination included by the inspection result information.

8. The inspection method according to claim 7, comprising
in the outputting, outputting a visualized image visualizing the information of the movement locus of the suspended matter.

9. The inspection method according to claim 7, wherein a time interval between the chronological images is determined in accordance with a difference in specific gravity between foreign matter to be detected in the container and the liquid encapsulated in the container.

10. The inspection method according to claim 7, wherein the chronological images include chronological images obtained by consecutively imaging the liquid moving in the container keeping still in a predetermined posture after tilted, swung, or rotated.

11. The inspection method according to claim 7, comprising
performing the outputting at any point of time after the inspection of the container ends.

12. The inspection method according to claim 7, comprising
performing the outputting as part of the inspection of the container, as soon as possible after performing the determination.

13. A non-transitory computer-readable recording medium on which a program is recorded, the program comprising instructions for causing a computer inspecting whether foreign matter is present or absent in a liquid encapsulated in a container to perform processes to:

detect and track suspended matter present in the liquid encapsulated in the container in chronological images obtained by consecutively imaging the liquid with a camera;

determine, based on a movement locus of the tracked suspended matter, whether the suspended matter is foreign matter or an air bubble;

store inspection result information including a result of the determination and information of the movement locus of the suspended matter used as a basis for the determination in association with identification information of the container; and output the result of the determination and the information of the movement locus of the suspended matter used as the basis for the determination included by the inspection result information.

* * * * *